United States Patent [19]
Leigers

[11] Patent Number: 4,470,244
[45] Date of Patent: Sep. 11, 1984

[54] FEEDING DEVICE FOR A SUGAR CANE HARVESTER

[75] Inventor: Günter Leigers, Harsewinkel, Fed. Rep. of Germany

[73] Assignee: Claas OHG, Harsewinkel, Fed. Rep. of Germany

[21] Appl. No.: 376,845

[22] Filed: May 10, 1982

[30] Foreign Application Priority Data

May 15, 1981 [DE] Fed. Rep. of Germany ... 8114378[U]

[51] Int. Cl.³ ............................................. A01D 45/10
[52] U.S. Cl. ..................................... 56/13.9; 56/15.5; 56/314
[58] Field of Search ...................... 56/13.9, 15.5, 19, 330, 56/98, 14.5, 314

[56] References Cited

U.S. PATENT DOCUMENTS

| 3,184,908 | 5/1965 | Rust | 56/330 |
| 4,035,996 | 7/1977 | Fernandez et al. | 56/13.9 |
| 4,383,400 | 5/1983 | Mead et al. | 56/330 |

Primary Examiner—Gene Mancene
Assistant Examiner—David I. Tarnoff
Attorney, Agent, or Firm—Michael J. Striker

[57] ABSTRACT

A feeding device of a sugar cane harvester includes a pair of rotary cane dividers spaced from each other. The feeding device is provided with a mechanism for adjusting the distance between two spaced cane dividers. This mechanism is operated from an operator stand of the harvester and includes a hydraulic piston-cylinder unit, the piston of which is connected to one of the cane dividers and the cylinder of which is connected to the harvester frame.

4 Claims, 2 Drawing Figures

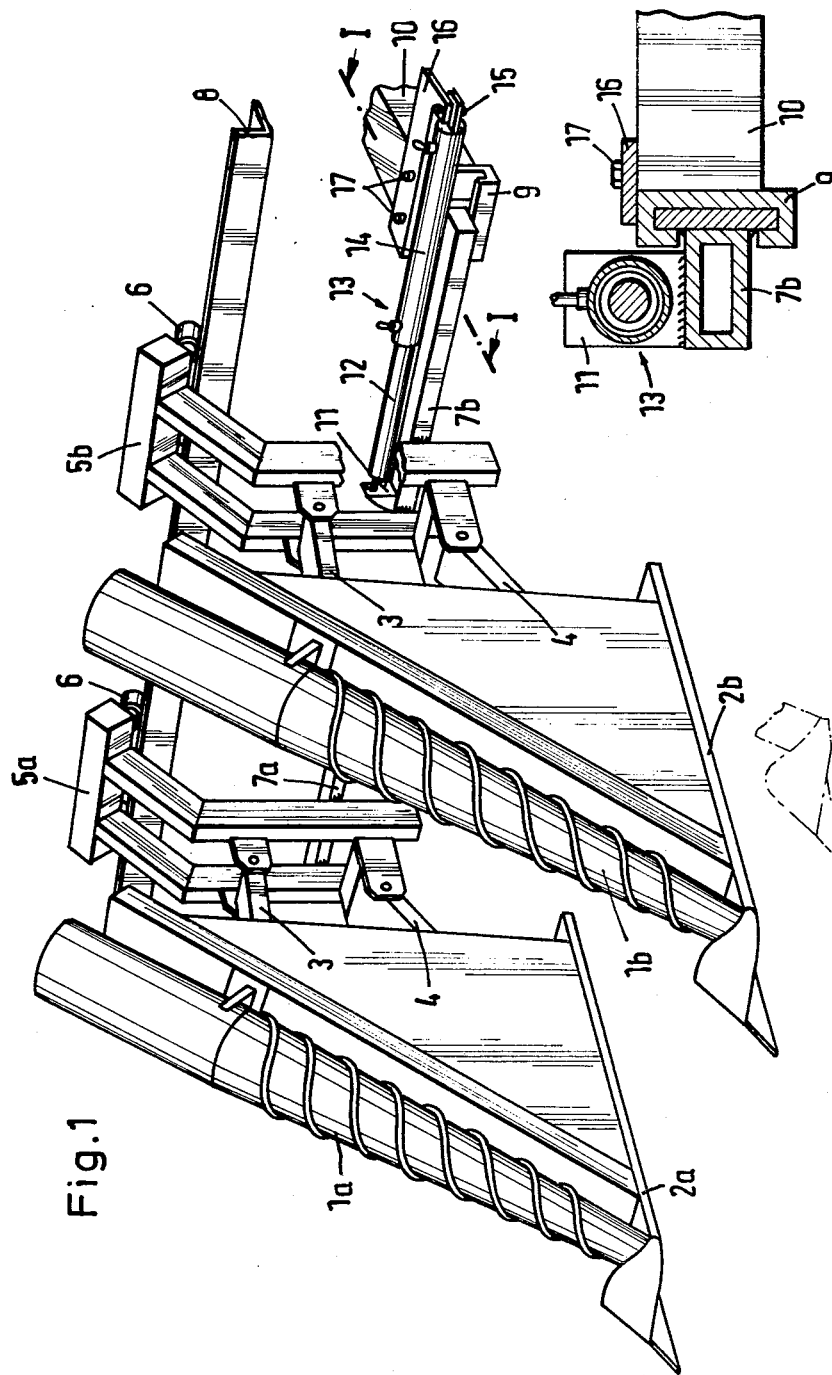

FEEDING DEVICE FOR A SUGAR CANE HARVESTER

BACKGROUND OF THE INVENTION

The present invention relates to a sugar can harvester in general, and, more particularly to a feeding device for a sugar cane harvester.

Sugar cane harvesters of the type under consideration are known in the art. One of such harvesters is disclosed, for example in U.S. Pat. No. 4,065,912. Sugar cane harvesters of the type under discussion normally include a feeding device operable to separate cane sticks from their roots and feeding the cane sticks into a cutting device from which cut sticks are fed into a conveyor of the harvester, which conveyor feeds the cut sticks to a purification stage.

The feeding device of the known in practice harvesters includes a pair of rotary cane dividers provided with skids. The cane dividers are normally spaced from each other at a predetermined distance which is not adjustable. The purpose of the rotary cane dividers is to feed sugar sticks into the harvester. In some cases the rotary cane dividers are mounted to a cutting mechanism of the harvester by means of parallel links. A hydraulic cylinder is employed to adjust the position of the cane dividers along the height of the harvester so as to also adjust the cutting height of the cutting mechanism. In some other constructions, rotary cane dividers are rigidly mounted to the frame of the harvester or to the cutting mechanism; in these latter cases the cutting height can not be adjusted by changing the position of the cane dividers. In these cases the cut height adjustment can be only achieved by lowering or lifting the whole harvester. In both cases, however, the rotary cane dividers are rigidly mounted to the frame of the harvester or to its cutting mechanism. The distance between two spaced cane dividers is once adjusted in accordance with a middle value. This is disadvantageous because in different conditions sugar sticks are not properly fed into the harvester. For example, standing and burnt sugar sticks require small cutting area (rotary cane dividers should be positioned rather close to each other) whereas hanging and lying sticks can not be properly fed into the machine under the above conditions and there is a risk that the machine will be blocked. Lying and hanging sugar sticks require a wider cutting area, and in this case the distance between two rotary cane dividers should be relatively large. If the distance between two cane dividers is relatively large, standing sugar canes in operation will fall out of the cutting area and will be lost for the harvest.

SUMMARY OF THE INVENTION

It is an object of the invention to provide an improved feeding device of a sugar cane harvester.

It is a further object of the invention to provide an improved feeding device for sugar cane harvester of a conventional type.

These and other objects are attained by a feeding device of a sugar cane harvester of the type having a frame and an operator stand, the device including a pair of rotary cane dividers spaced from each other at a distance defining a feeding area, and means for adjusting said distance, said means being operatively connected to at least one of said cane dividers and being operable from the operator stand at standstill of the harvester and during its travelling movement.

The feeding device may include a rail rigidly mounted to the harvester frame, the cane dividers being adapted to slidably move along the rail to preliminarily adjust said distance when the harvester is at stillstand. Such a preliminary adjustment depending on the kind of the field being worked can be made by hand.

In conventional feeding devices the cane dividers are locked in the preliminarily adjusted position and the feeding of sugar canes starts. If the conditions of work are changed and different kinds of sugar canes are to be harvested the operator should stop the harvester and adjust the distance between the cane dividers depending upon these new conditions; this is time consuming.

According to the invention the positions of the cane dividers relative to each other can be easily changed in a very convenient and satisfactory fashion. The position of at least one cane divider is changed directly from the operator booth or stand by means of the adjusting means of the invention when the harvester is in its inoperative position or when it travels along the field.

In accordance with further features of the invention the adjusting means includes a hydraulic piston-cylinder unit including a piston and a cylinder, the piston being operatively connected to said one cane divider and the cylinder being operatively connected to the harvester frame.

The piston may be immediately connected to the one cane divider.

The feeding device may include a carrier rigidly connected to the harvester frame, said cylinder being mounted to the carrier.

According to futher distinctive features of the invention said one cane divider may be provided with a carrying arm, the adjusting means further including a guiding rail rigidly connected to the carrier and a slide slidably movable in the guiding rail, said slide being rigidly connected to the carrying arm of said one divider.

The piston may be rigidly connected at its one end to the above mentioned slide.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a perspective view of a feeding device of a sugar cane harvester according to the invention; and FIG. 2 is a sectional view along line II—II of FIG. 1.

DETAILED DESCRIPTION OF THE PREFERRED EMBODIMENTS

With reference to the drawings it will be seen that reference characters 1a and 1b denote two rotary sugar cane dividers of a feeding device of a non-illustrated sugar cane harvester, each cane divider forming together with its respective skid 2a or 2b an assembly unit. Skids 2a and 2b are each connected to a respective supporting arm 5a and 5b by means of levers 3 and 4. Supporting arms 5a and 5b are provided at the upper portions thereof with rolls 6. Arms 5a and 5b at their lower portions are supported on respective slide guides 7a and 7b. As seen from FIG. 1 each roll 6 is slidably mounted on a rail 8 which is rigidly connected to the frame of the sugar cane harvester not shown herein.

Supporting arm 5a and thus the rotary cane divider 1a with its skid 2a loosely lie against the guide 7a under the influence of their weight. Guide 7a is rigidly connected to the frame of the sugar cane harvester. Supporting arm 5a, of course, can be moved by hand along the rail 8 by means of roll 6 and arrested in any desired position relative to the rail 8 by any suitable means not shown herein.

The supporting arm 5b in contrast to the supporting arm 5a is rigidly connected to the slide guide 7b, for example by welding. Guide 7b is adapted for slidable movement along a rail 9 (as seen also in FIG. 2) which is rigidly mounted, for example by means of bolts, to a carrier 10 rigidly connected to the frame of the harvester. Slidable movement of guide 7b along rail 9 is obtained by means of a piston-cylinder unit 13. Guide 7b is provided with a cantilever 11 welded thereto, which cantilever holds an end of a hydraulic piston 12 of the piston-cylinder unit 13. Cylinder 14 of the unit 13 is coupled to a plate 16 which in turn is rigidly connected to carrier 10 by bolts 17. Upon the actuation of piston 12 of the piston cylinder unit 13 the rotary cane divider 1b together with its skid 2b will slide in a required direction without the necessity for an operator to leave a driver stand. It is also not necessary to stop the harvester to adjust the distance between two rotary cane dividers 1a and 1b since such an adjustment can be attained by operating the hydraulic piston-cylinder unit 13 in the manner described above. It is, of course, understood that any suitable conventional means for connecting the hydraulic unit 13 with the operator stand to enable the operator to operate the piston-cylinder unit are provided in the sugar cane harvester of the invention.

It will be understood that each of the elements described above, or two or more together, may also find a useful application in other types of sugar cane harvesters differing from the types described above.

While the invention has been illustrated and described as embodied in a feeding device of a sugar cane harvester, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A feeding device of a sugar cane harvester of the type having a frame and an operator stand, the device including a pair of rotary cane dividers spaced from each other at a distance defining a feeding area, and means for adjusting said distance, said adjusting means being operatively connected to at least one of said cane dividers, said at least one cane divider including a supporting arm, said adjusting means including a slide rigidly connected to said supporting arm, a guiding rail rigidly connected to said frame and receiving said slide, and a piston-cylinder unit including a piston and a cylinder, said piston being rigidly connected to said slide and operated to move said slide in said guiding rail to thereby adjust said distance, said piston-cylinder unit being operable from the operator stand at standstill of the harvester and during its travelling movement.

2. The device as defined in claim 1, further including an additional rail rigidly mounted to the harvester frame, said cane dividers being adapted to slidably move along said additional rail to preliminarily adjust said distance when the harvester is at standstill.

3. The device as defined in claim 2, including a carrier rigidly connected to the harvester frame, said cylinder being mounted to said carrier.

4. The device as defined in claim 3, wherein said guiding rail is rigidly connected to said carrier.

* * * * *